Oct. 31, 1950 M. CAMRAS 2,528,261

APPARATUS FOR MAGNETIC RECORDING

Filed June 1, 1946

Inventor
Marvin Camras by The Firm of Charles W. Hills Attys.

Patented Oct. 31, 1950 2,528,261

UNITED STATES PATENT OFFICE 2,528,261

APPARATUS FOR MAGNETIC RECORDING

Marvin Camras, Chicago, Ill., assignor to Armour Research Foundation of Illinois Institute of Technology, Chicago, Ill., a corporation of Illinois Application June 1, 1946, Serial No. 673,739

6 Claims. (Cl. 179—100.2)

This invention relates to a method and means for magnetic recording, and more particularly to a magnetic recording technique in which a very low permeability magnetic record medium is used, but which has relatively high coercive force.

It has been observed that magnetic records made in the conventional manner using record members, such as wire or tape, which have relatively high permeability as well as coercive force, suffer from a lack of constancy of the wire contact with the head. The relation of the record medium with respect to the recording slot and gap is critical. An imperfect contact by the record medium with the head causes noise, irregularities, and loss of high frequency response.

This difficulty in magnetic recording has been realized in the past and various means have been atempted in order to minimize this fault. These attempts to minimize the fault in the past have been greatly limited due to the fact that they either introduced greater precision with increased cost, complexity and difficulty of keeping in adjustment, or were made at a sacrifice of easy threading or knot by-passing features.

It should be noted that the common belief in the past has been that a record medium having high permeability is desirable for magnetic recording purposes, since the more permeable materials would absorb and guide the magnetic lines of force more readily, confining them in the record medium.

One of the principal features and objects of the present invention is to provide a new recording technique which greatly reduces the imperfections of the past which were causd by variations of the contact spacing of the record member with the magnetic head.

More particularly, it is an object of the present invention to provide a novel method and means for magnetic recording which includes the use of low permeability magnetic record members.

It is a further object of the present invention to provide a novel method and means for magnetic recording wherein a magnetic record member is used having a residual permeability of less than 50 and a coercive force of more than 100.

Another object of the present invention is to provide a novel magnetic record member having a permeability less than 50 and formed of an austenitic stainless steel.

Another and still further object of the present invention is to provide a novel magnetic record member having a permeability of approximately 12 and a coercive force of more than 100.

The novel features which I believe to be characteristic of my invention are set forth with particularity in the appended claims. My invention, itself, however, both as to its manner of construction and method of operation, together with further objects and advantages thereof, may best be understood by reference to the following description taken in connection with the accompanying drawing, in which:

Figure 1:
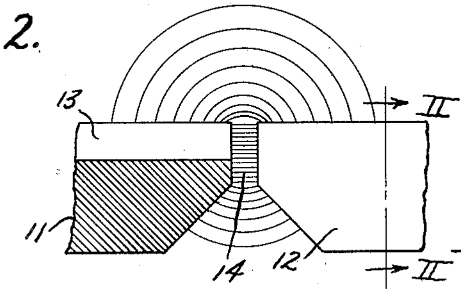
Figure 1 is a diagrammatic sketch of the pole tips of a magnetic recorder head showing the field distribution around the head, and one of the pole tips being in vertical section.
Figure 2:
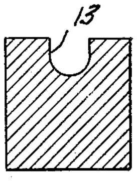
Figure 2 is a sectional view of one of the pole tips of the recorder head shown in Figure 1 and taken along the line II—II of Figure 1.
Figure 10:
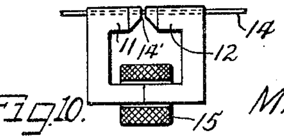
Figure 10 is a diagrammatic view of a recording head, the pole tips of which are illustrated in Figure 1.

In Figure 1 of the drawing, I have illustrated two pole portions 11 and 12 on a magnetic recording head. These pole portions 11 and 12 are provided with longitudinally extending grooves 13 which are arranged to receive a wire 14 (see Figure 4). The pole portions 11 and 12 have tapered confronting tips as is clearly shown in Figure 1. As shown in Fig. 10, a signal coil 15 is mounted on the magnetic core 16 which includes the pole pieces 11 and 12 so that when a signal is to be recorded on the wire 14 a field is established across the non-magnetic gap 14' which lies between the confronting pole pieces 11 and 12.

Figure 3:
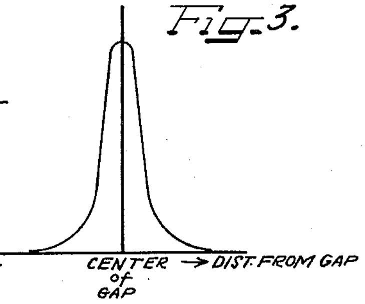
Figure 3 is a diagrammatic sketch of the relative flux density in the wire passageway.

The field distribution of the wire which lies in the slot 13 is shown in Figure 1, while the relative flux density is clearly shown in Figure 3. As may be observed from Figure 3, the greatest concentration of flux lies in the non-magnetic gap 14' between the confronting pole portions 11 and 12.

Figure 4:
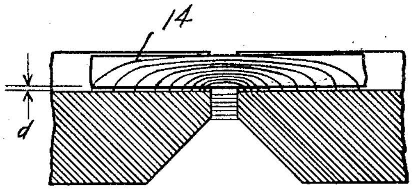
Figure 4 is a vertical sectional view of the pole tips shown in Figure 1 with a wire disposed in the slot and crossing the non-magnetic gap, as well as showing the field distribution when the wire in the slot is of high permeability material.

If a magnetic record member of high permeability, such, for example, as the wire 14, is now placed in the groove 13 so as to extend across the non-magnetic gap 14', the flux lines are crowded into the wire 14 in the manner shown in Figure 4. As will be observed, the wire 14 is illustrated as being slightly spaced from the bottom of the slot 13 and specifically spaced therefrom by a distance indicated by the reference character *d*. Due to the fact that you can never get a perfect contact between the wire record member and the bottom of the slot in a recording head, there is always some space at this point.

Figure 5:
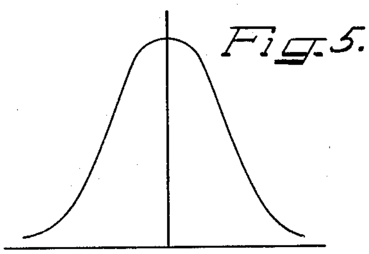
Figure 5 is a sketch similar to Figure 3 but showing the relative flux density in the wire as it lies in the slot.

It will further be observed from an inspection of Figure 5 that the flux density distribution is not as sharp. More particularly, the flux takes the easiest path by entering and leaving the wire at points remote from the gap.

Figure 6:
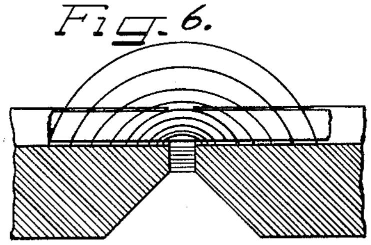
Figure 6 is a view similar to Figure 4 but showing the field distribution when the wire is of low permeability material.

If a wire of low permeability, and particularly, of a permeability of 50 or less is introduced into the same head, the flux distribution would be like that illustrated in Figure 6 of the drawing. It will be noted that variations in the distance *d* will not make very much difference in Figure 6, although they will make a very substantial difference in Figure 4. The reason for this is that the flux distribution in Figure 6 is very similar to that in Figure 1, and indeed, would be exactly the same as Figure 1 if the permeability of the wire were one.

Figure 7:
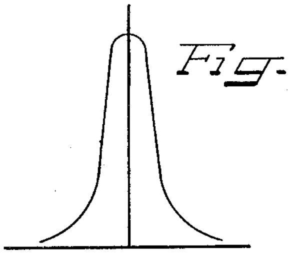
Figure 7 is a view similar to Figures 3 and 5 but shows the relative flux density in the wire as it lies in the slot.

Figure 7 illustrates the relative flux density in the wire at the gap when the wire is of low permeability material such as that shown in Figure 6.

Figure 8:
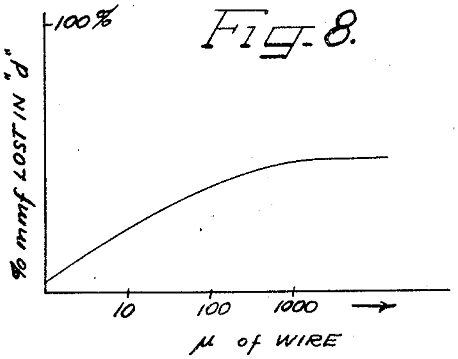
Figure 8 is a chart showing the percent m. m. f. loss in space between the wire and the head for different wire permeabilities.

Figure 8 gives the percent m. m. f. loss in the space *d* which is the space between the bottom of the wire and the bottom of the slot for different values of permeability.

Figure 9:
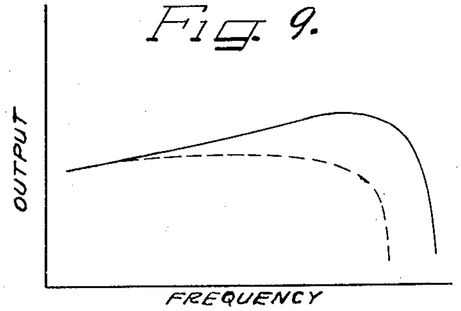
Figure 9 shows the frequency response of a low permeability wire and of a high permeability wire.

Figure 9 gives the response characteristics of a low permeability wire and of a high permeability wire. From this chart, it will be observed that the relative d. b. output is less for high permeability wire than for low permeability wire as frequency increases, a feature which is quite desirable.

The term "permeability" as used throughout refers to the residual permeability which may be defined as the slope of the $B_R$–H curve at the operating point, where $B_R$ is residual magnetic induction after the field H has been removed. This closely resembles the differential permeability which is the slope of the B–H curve where B is the magnetic induction while field H is present.

The foregoing description has been an explanation of the very substantial difference which is obtained in a magnetic recording technique wherein a low permeability wire is used in the place of a high permeability wire. It has been found in practice that the advantages of the use of a low permeability record medium may be obtained as hereinbefore described when the permeability of the record medium is less than 50. Some of the best results are obtained when the permeability is in the neighborhood of 12. It must, however, be remembered that a high coercive force is desirable in order to retain enough magnetism to be useful.

In practice, it has been found that the coercive force should be over 100, and preferably, over 250 oersteds. One material which has been found to be particularly efficient in practicing the method of the present invention is an austenitic stainless steel which has been cold-worked up to a point where its permeability is less than 50, and to where its coercive force is over 100.

While a stainless steel wire has been described in the foregoing paragraphs, other materials having the characteristics hereinbefore specified may be used whether they be in the form of a wire or other thread-like medium, or whether they be in the form of a tape.

While I have shown and described a certain particular embodiment of my invention, it will of course, be understood that I do not wish to be limited thereto, since many modifications may be made, and I, therefore, contemplate by the appended claims to cover all such modifications that fall within the true spirit and scope of my invention.

I claim as my invention:

1. A magnetic recorder comprising a magnetizable record medium, a magnetic core including a pair of magnetizing pole members in closely spaced confronting relation across which said record medium extends, said confronting poles being spaced in the direction of travel of the record medium and both being disposed on the same side of the record medium and a signal coil mounted on said core, said magnetizable record medium having a residual permeability of less than 50 and a coercive force of approximately 250 oersteds or more.

2. A magnetic recorder comprising a magnetizable record medium, a magnetic core including a pair of closely spaced confronting magnetizing pole members across which said record medium extends, and a signal coil mounted on said core, said magnetizable record medium being a continuous metallic record member having a residual permeability of approximately 12 and a coercive force of more than 100 oersteds.

3. A magnetic recorder comprising a magnetizable record medium, a magnetic core including a pair of closely spaced confronting magnetizing pole members across which said record medium extends, and a signal coil mounted on said core, said magnetizable record medium having a residual permeability of less than 50 and a coercive force of more than 250 oersteds.

4. A magnetic recorder comprising a magnetizable record medium, a magnetic core including a pair of closely spaced confronting magnetizing pole members across which said record medium extends, and a signal coil mounted on said core, said magnetizable record medium having a residual permeability of approximately 12 and a coercive force of more than 250 oersteds.

5. A magnetic recorder comprising a magnetizable record medium, a magnetic core including a pair of closely spaced confronting magnetizing pole members across which said record medium extends, and a signal coil mounted on said core, said magnetizable record medium having a residual permeability between 10 and 50 and a coercive force of more than 100 oersteds.

6. A magnetic recorder comprising a magnetizable record medium, a magnetic core including a pair of closely spaced confronting magnetizing pole members across which said record medium extends, and a signal coil mounted on said core, said magnetizable record medium having a residual permeability between 10 and 50 and a coercive force of more than 250 oersteds.

MARVIN CAMRAS.

REFERENCES CITED

The following references are of record in the file of this patent:

UNITED STATES PATENTS

| Number | Name | Date |
|---|---|---|
| 2,351,005 | Camras | June 13, 1944 |

OTHER REFERENCES

The Alloys of Iron and Chromium, vol. II, Kinzel and Franks, 1st ed., 1940, McGraw-Hill Book Co., Inc., N. Y. C., pages 339 and 340.